US008884761B2

(12) United States Patent
Valiulis

(10) Patent No.: US 8,884,761 B2
(45) Date of Patent: Nov. 11, 2014

(54) THEFT DETECTION DEVICE AND METHOD FOR CONTROLLING

(75) Inventor: Thomas E. Valiulis, Rockford, IL (US)

(73) Assignee: Souther Imperial, Inc., Rockford, IL (US)

( * ) Notice: Subject to any disclaimer, the term of this patent is extended or adjusted under 35 U.S.C. 154(b) by 276 days.

(21) Appl. No.: 13/591,023

(22) Filed: Aug. 21, 2012

(65) Prior Publication Data

US 2014/0055266 A1 Feb. 27, 2014

(51) Int. Cl.

*G08B 13/14* (2006.01)
*H04Q 5/22* (2006.01)
*G06F 17/00* (2006.01)

(52) U.S. Cl.

USPC .................... 340/568.1; 340/572.1; 340/10.1; 340/572.8; 340/568.4; 235/375

(58) Field of Classification Search

USPC ..................... 340/457.1, 572.1, 571; 235/375
See application file for complete search history.

(56) References Cited

U.S. PATENT DOCUMENTS 4,383,242 A 5/1983 Sassover et al.
4,462,023 A 7/1984 Nielsen et al.
5,068,643 A 11/1991 Yashina
5,168,263 A 12/1992 Drucker
5,434,559 A 7/1995 Smiley et al.
5,570,080 A 10/1996 Inoue et al.
5,757,270 A 5/1998 Mori
5,955,951 A 9/1999 Wischerop et al.
5,979,674 A 11/1999 Thalenfeld
6,049,268 A 4/2000 Flick
6,133,830 A 10/2000 D'Angelo et al.
6,373,381 B2 4/2002 Wu
6,517,000 B1 2/2003 McAllister et al.
6,690,411 B2 2/2004 Naidoo et al.
6,967,578 B1 11/2005 Guida
7,530,188 B2 5/2009 Beilenhoff et al.
7,584,930 B2 9/2009 Zich
7,591,422 B2 9/2009 Maitin
7,671,741 B2 3/2010 Lax et al.
7,671,742 B2 3/2010 Fallin et al.
7,768,399 B2 8/2010 Hachmann et al.
7,916,020 B2 * 3/2011 Seidel ........................ 340/568.1
7,969,305 B2 6/2011 Belden, Jr. et al.
8,274,391 B2 9/2012 Yang
8,368,542 B2 * 2/2013 Yang .......................... 340/572.8
8,373,564 B2 * 2/2013 Wyatt et al. ................ 340/572.1
8,378,826 B2 2/2013 Mercier et al.

(Continued)

FOREIGN PATENT DOCUMENTS

DE 102011012163 A1 8/2012
KR 100823026 B1 4/2008

(Continued)

OTHER PUBLICATIONS

U.S. Appl. No. 13/591,040, filed Aug. 21, 2012, Valiulis et al.

(Continued)

*Primary Examiner* — Fekadeselassie Girma
(74) *Attorney, Agent, or Firm* — Reinhart Boerner Van Deuren P.C.

(57) ABSTRACT

A merchandise tag and a method of controlling a merchandise tag are provided. The merchandise tag may be used to deter theft of retail products.

16 Claims, 8 Drawing Sheets

(56) References Cited

U.S. PATENT DOCUMENTS

| | | | | |
|---|---|---|---|---|
| 8,534,469 | B2 | 9/2013 | Northrup, Jr. et al. | |
| 8,629,772 | B2 | 1/2014 | Valiulis et al. | |
| 2002/0067259 | A1 | 6/2002 | Fufidio et al. | |
| 2002/0130776 | A1 | 9/2002 | Houde | |
| 2003/0030548 | A1 | 2/2003 | Kovacs et al. | |
| 2003/0175004 | A1 | 9/2003 | Garito et al. | |
| 2003/0227382 | A1 | 12/2003 | Breed | |
| 2004/0145477 | A1 | 7/2004 | Easter et al. | |
| 2005/0104733 | A1 | 5/2005 | Campero | |
| 2006/0198611 | A1 | 9/2006 | Park | |
| 2007/0080806 | A1* | 4/2007 | Lax et al. | 340/572.1 |
| 2009/0079557 | A1* | 3/2009 | Miner | 340/457.1 |
| 2009/0095695 | A1 | 4/2009 | Moock et al. | |
| 2009/0109027 | A1 | 4/2009 | Schuller | |
| 2010/0097223 | A1 | 4/2010 | Kruest et al. | |
| 2010/0175438 | A1 | 7/2010 | Sankey | |
| 2010/0238031 | A1 | 9/2010 | Belden, Jr. et al. | |
| 2011/0215060 | A1 | 9/2011 | Niederhuefner | |
| 2011/0227735 | A1 | 9/2011 | Fawcett et al. | |
| 2013/0142494 | A1 | 6/2013 | Valiulis et al. | |
| 2014/0070948 | A1 | 3/2014 | Valiulis et al. | |

FOREIGN PATENT DOCUMENTS

| | | | |
|---|---|---|---|
| KR | 20100137956 | A | 12/2010 |
| KR | 2020110002261 | U | 3/2011 |
| KR | 20110043837 | A | 4/2011 |
| KR | 20110080411 | A | 7/2011 |
| WO | WO 01/81988 | A2 | 11/2001 |
| WO | WO 2011/025085 | A1 | 3/2011 |

OTHER PUBLICATIONS

Indyme smartresponse; 2 pages printed from internet http://www.indyme.com/; date last visited Apr. 8, 2013.

U.S. Appl. No. 14/215,538, filed Mar. 17, 2014, Valiulis et al.

* cited by examiner

THEFT DETECTION DEVICE AND METHOD FOR CONTROLLING

FIELD OF THE INVENTION

This invention generally relates to retail systems, and, more particularly, to theft detection systems for use in a retail environment.

BACKGROUND OF THE INVENTION

The retail industry looks to prevent loss due to theft. Therefore, many retail environments include theft deterrence systems. Some retail environments may provide an electronic article surveillance (EAS) system in which gates may be located proximate the exit to the retail environment. In such a system, a tag may be placed on merchandise, and if an EAS gate senses a tag passing through it, it sounds an alarm. Thus, the alarm is typically sounded only as the thief and the stolen merchandise are already leaving the retail environment.

BRIEF SUMMARY OF THE INVENTION

One embodiment of the invention relates to a theft detection device configured to be coupled to a product. The theft detection device includes a light sensor, a motion sensor, an emitter, and a controller. The controller is coupled to the light sensor, the motion sensor, and the emitter. The controller is configured to determine when the light level sensed by the light sensor is below a threshold light level. The controller is configured to determine whether the theft detection device is in motion. The controller is configured to control the emitter to emit an alarm signal based on the sensed motion of the theft detection device and the light level sensed by the sensor.

Another embodiment of the invention relates to a method of controlling a theft detection device configured to be coupled to a product. The theft detection device includes a light sensor and an emitter. The method includes coupling the theft detection device to a product. The method includes determining when a potential theft condition exists. The method also includes causing the emitter to emit an alarm signal when the potential theft condition exists.

Another embodiment of the invention relates to a method of controlling a theft detection device coupled to a product. The theft detection device includes a light sensor, a motion sensor, and an emitter. The method includes determining whether to control the emitter to emit an alarm signal. Determining whether to control the emitter to emit an alarm signal includes determining whether the theft detection device is in motion matching a predetermined motion profile. Determining whether to control the emitter to emit an alarm signal also includes determining whether the light sensor detects a light level below a predetermined light level. When it is determined to control the emitter to emit the alarm signal, causing the emitter to emit the alarm signal.

Another embodiment of the invention relates to a controller for a theft detection device configured to be coupled to a product. The theft detection device includes a light sensor, a motion sensor, and an emitter. The controller includes an output configured to be coupled to the emitter. The controller is configured to receive an input from the light sensor indicative of the light level sensed by the light sensor. The controller is configured to receive an input from the motion sensor indicative of when the motion sensor is in motion. The controller is configured to send a control signal to the emitter through the output to emit an alarm signal based on the input from the light sensor and the input from the motion sensor.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

While the invention will be described in connection with certain exemplary embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Before turning to the figures, which illustrate the exemplary embodiments in detail, it should be understood that the present application is not limited to the details or methodology set forth in the description or illustrated in the figures.

Generally one embodiment of a theft detection device shown in the figures as a merchandise tag is provided. In retail stores, thieves may tend to take products and place them into a bag, purse, or other enclosure, to hide the items. Low light levels around a product in conjunction with movement of a merchandise product are indicative that the product may be being stolen. A merchandise tag may be coupled to a product and detect low light levels and movement to determine when a potential theft condition exists.

Figure 1:
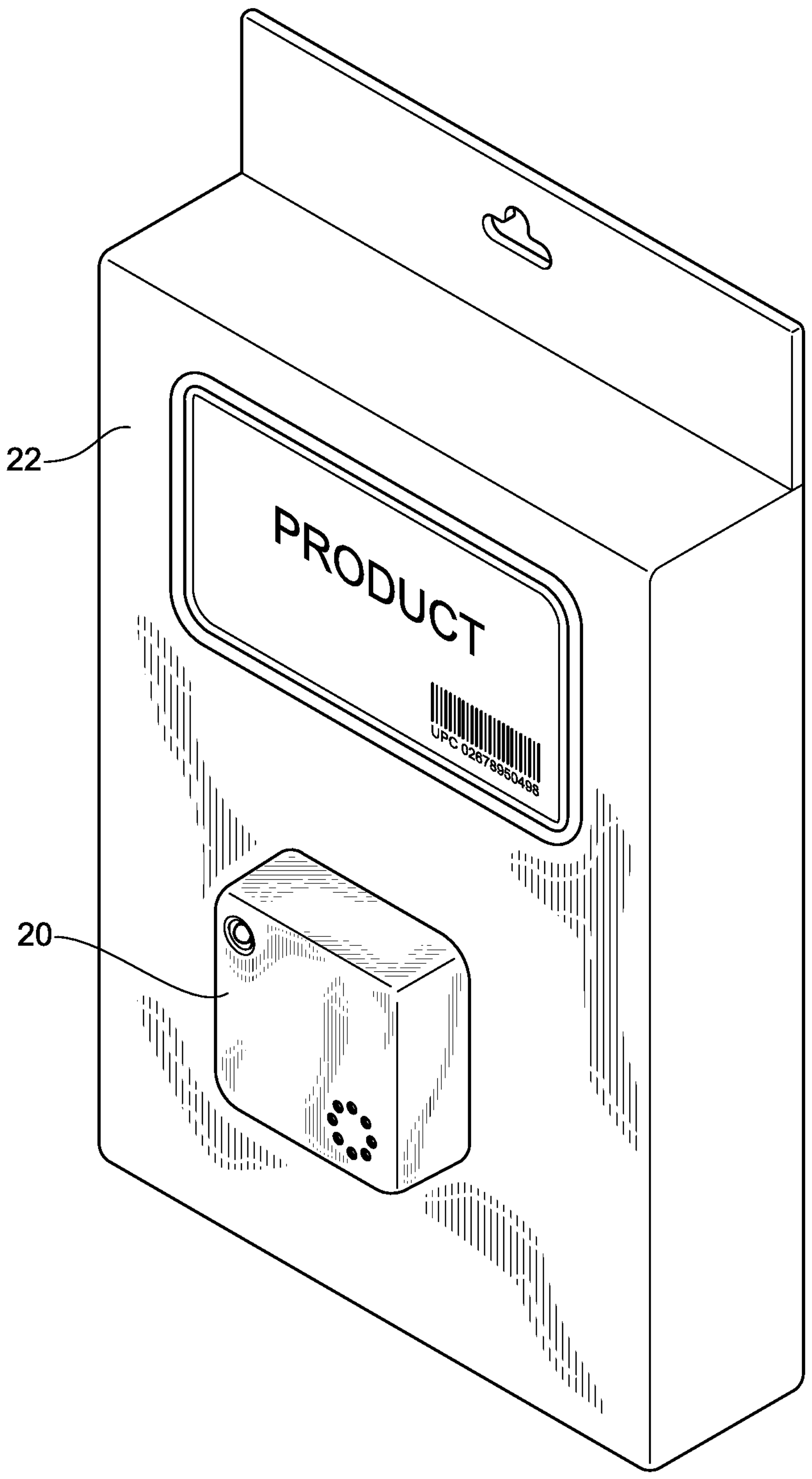
FIG. 1 is a perspective view of an embodiment of a theft detection device shown as a merchandise tag coupled to a product, such as a merchandise product.

With reference to FIG. 1, a merchandise tag 20 is illustrated. The merchandise tag 20 is attached to a product, shown as a merchandise product 22. The merchandise tag 20 may be attached to any type of product to deter theft of the merchandise product. Additionally, the merchandise tag 20 may be coupled to any suitable surface of the merchandise product 22.

Figure 2:
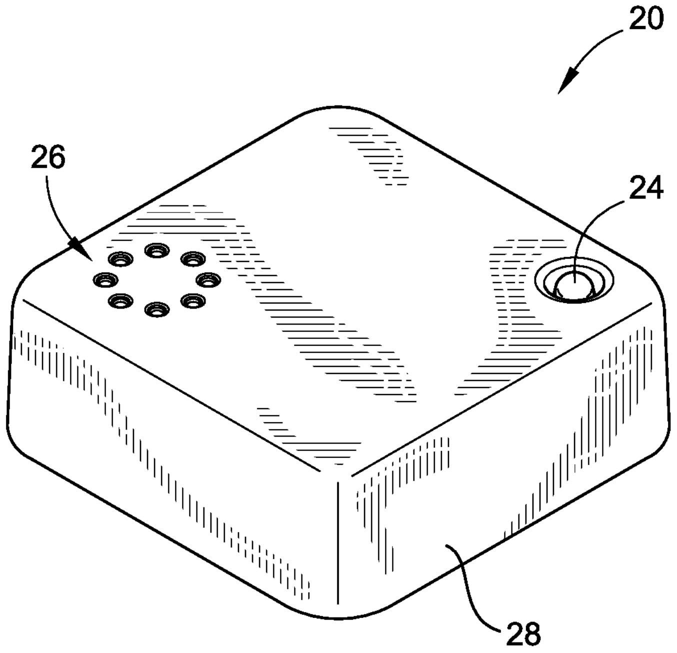
FIG. 2 is a top perspective view of the merchandise tag of FIG. 1.

As illustrated in FIG. 2, the merchandise tag 20 includes a light sensor 24 and an emitter 26. The light sensor 24 may be any suitable type of photocell, photo detector, photoresistor, light dependent resistor, or any other suitable type of light sensor. The emitter 26 may be configured to emit audible sound signals, infrared signals, visible light signals, RF signals, AM signals, FM signals, microwave signals, combinations thereof, or any other suitable type of signal.

The merchandise tag 20 also includes a housing 28.

Figure 3:
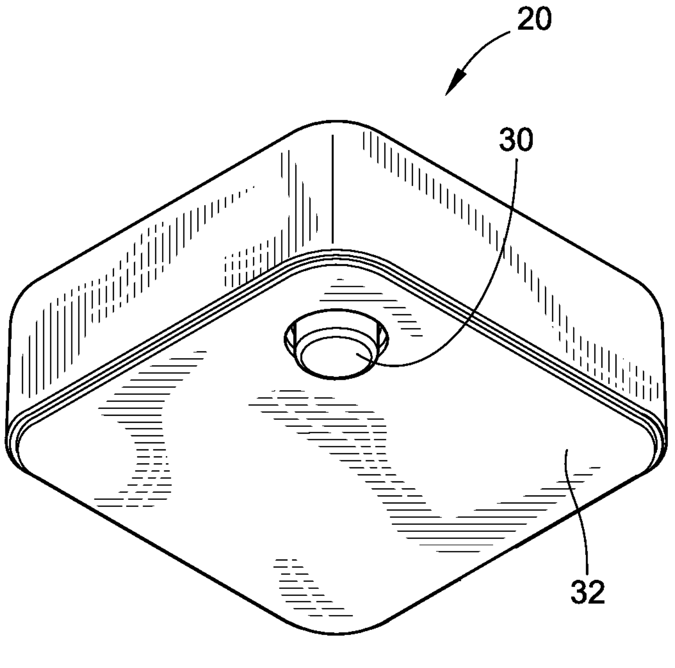
FIG. 3 is a bottom perspective view of the merchandise tag of FIGS. 1 and 2.

With reference to FIG. 3, in one embodiment the merchandise tag 20 includes an activator, such as an activation button 30. The activation button 30 projects through an attachment portion 32 of the merchandise tag 20. The activation button 30 is configured to activate the merchandise tag 20 when actuated, in the illustrated embodiment depressed. When the attachment portion 32 of the merchandise tag 20 is coupled to a merchandise product 22, the activation button 30 is depressed, activating the merchandise tag 20. In one embodiment, the attachment portion 32 may include adhesive to couple the merchandise tag 20 to a merchandise product. In other embodiments, the merchandise tag 20 may be attached to a merchandise product by any other suitable mechanism (e.g., staple, tape, tie, etc.). In one embodiment the merchandise tag 20 is configured to be permanently attached to the merchandise product 22. In another embodiment the merchandise tag 20 is configured to be releasably attached to the merchandise product 22.

Figure 4:
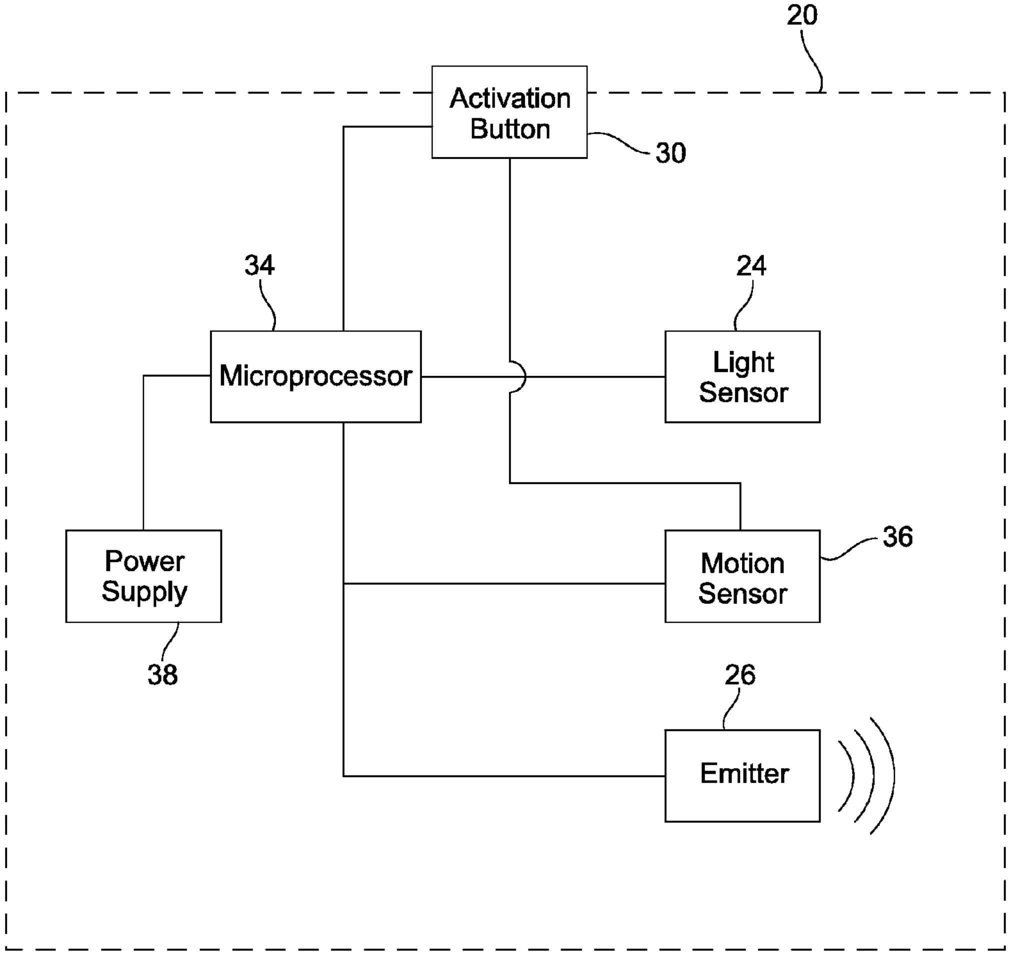
FIG. 4 is a block diagram of an embodiment of a merchandise tag.

FIG. 4 is a schematic illustration of the merchandise tag 20. The merchandise tag 20 includes a controller, illustrated in FIG. 4 as a microprocessor 34. The microprocessor 34 is electrically coupled with the light sensor 24 and the emitter 26. The merchandise tag 20 also includes a motion sensor 36. The microprocessor 34 is also electrically coupled to the motion sensor 36. As is further described below, the microprocessor 34 is configured to determine from the light sensor 24 and motion sensor 36 when the merchandise tag 20, and thus the merchandise product to which it is attached, is in low light and in motion, indicating a potential theft condition.

The activation button 30 is configured to activate the motion sensor 36 when the activation button 30 is actuated. In one embodiment, the activation button 30 is also coupled to the microprocessor 34 with the microprocessor 34 configured to determine when the activation button 30 is in an actuated state or an unactuated state. Additionally, the microprocessor 34 is coupled to a power supply 38. The power supply 38 may be a battery, solar cell, or any other suitable power supply.

Embodiments of merchandise tags, such as, e.g., merchandise tag 20, may be controlled according to various methods, as will be further described below. In one embodiment a merchandise tag is coupled to a merchandise product and activated. When a light sensor of the merchandise tag detects a light level below a predetermined light level and the motion sensor of the merchandise tag detects movement of the merchandise tag for more than a predetermined alarm time period, without the light sensor detecting a light level that is at or above the predetermined light level or the motion sensor detecting that the merchandise tag is no longer in motion for more than a preset interruption time, the controller controls the emitter to emit an alarm signal.

Figure 5:
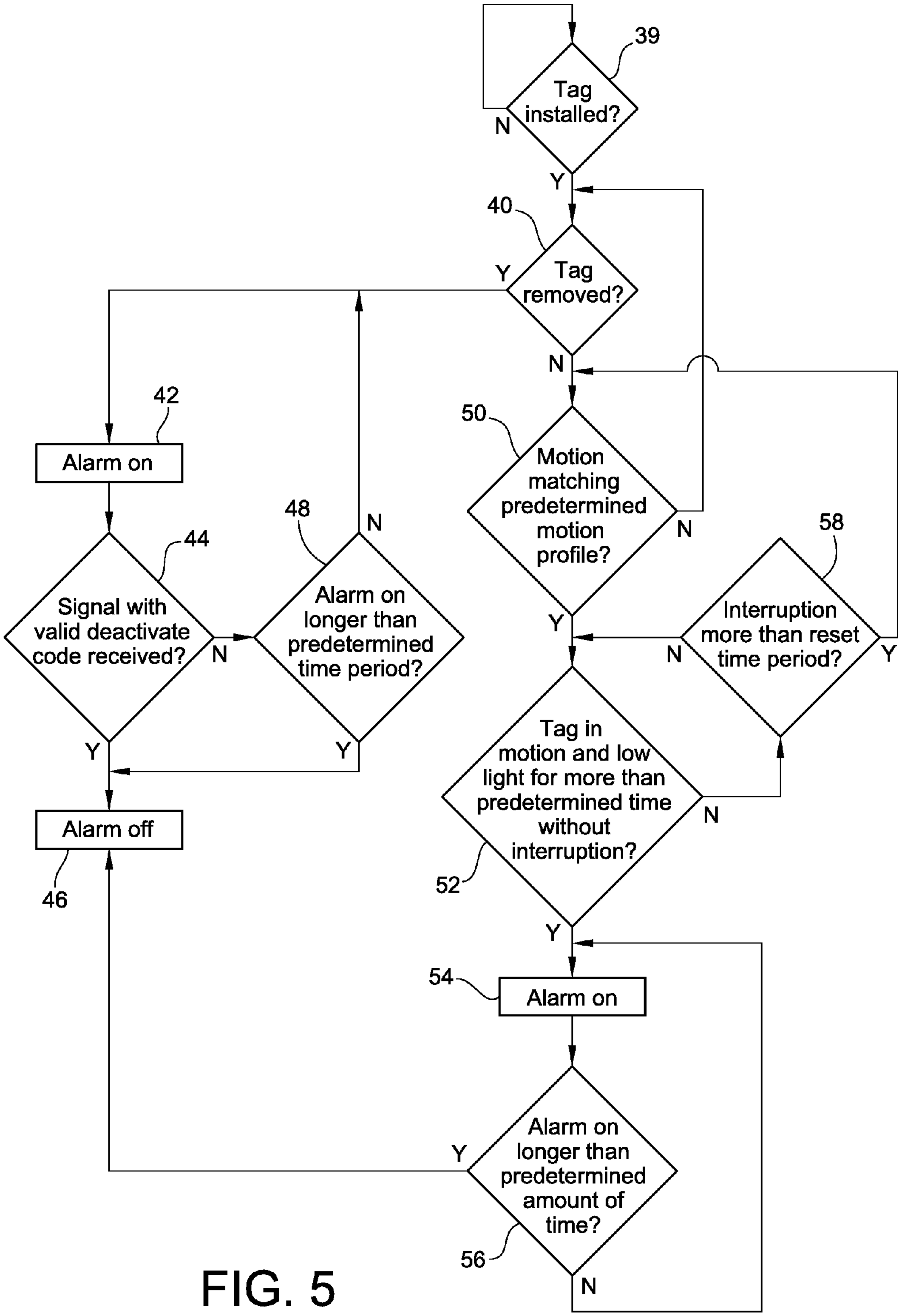
FIG. 5 is a flow diagram illustrating an embodiment of a method of controlling an embodiment of a merchandise tag.

With reference to FIG. 5, a flow diagram of an embodiment of a method of controlling an embodiment of a merchandise tag is illustrated. The embodiment of the method may be used to control a merchandise tag such as merchandise tag 20, illustrated in FIGS. 1-4. The embodiment of the method may also be used to control other embodiments of merchandise tags. In one embodiment, the merchandise tag controlled with the embodiment of the method described below includes a controller coupled to an emitter, a light sensor, and a motion sensor. In another embodiment, the merchandise tag also includes a receiver coupled to the controller.

In one embodiment, the controller determines whether a merchandise tag has been installed on a merchandise product (step 39). If the merchandise tag has not been installed, the controller returns to step 39. If the merchandise tag has been installed, the controller determines whether the merchandise tag has been removed from a merchandise product (step 40), e.g., by determining whether the activator of the merchandise tag has been actuated. In one embodiment, the controller remains in a sleep/power saving mode until it is triggered, e.g., by actuation of an activation button of the merchandise tag, i.e., until the merchandise tag has been installed on a merchandise product.

If the tag has been removed, the controller controls the emitter of the merchandise tag to emit an alarm signal (step 42). The controller determines if the tag has received a signal with a valid deactivate code (step 44). The tag may be configured to receive a signal including a deactivation code from a portable strobe key, such as that described in U.S. patent application Ser. No. 13/591,040, entitled Theft Detection System, filed concurrently herewith, which is incorporated herein by reference in its entirety. In one embodiment, the light sensor is configured to receive a pattern of flashing light (e.g., spatial pattern, series of flashes on and off of strobe key, etc.). The controller determines if the pattern received by the light sensor is a valid deactivation pattern (e.g., matches a preprogrammed deactivation code, etc.).

Additionally, in other embodiments, the controller may receive a deactivation code from any suitable signal source, e.g., at check out, from employee working with merchandise, etc. In one embodiment where the tag includes a receiver, the controller may be configured to receive any suitable type of signal including a deactivation code, including, for example, RF signals, infrared signals, audible signals, light signals, combinations of these, or other suitable signals.

The controller determines if a deactivate code signal has been received, and if so, whether the deactivate code signal contains a valid deactivate code (step 44). If a signal with a valid deactivate code has been received, the controller controls the emitter to stop emitting the alarm signal (step 46). If the controller determines that it has not received a signal with a deactivate code or that the deactivate code received is not valid, the controller determines whether the emitter has been emitting the alarm signal for longer than a predetermined alarm time period (step 48). If the emitter has not been emitting the alarm signal for longer than the predetermined alarm time period, the controller returns to step 42 and continues to control the emitter to emit an alarm signal. If the controller determines that the emitter has been emitting the alarm signal for longer than the predetermined alarm time period, the controller controls the emitter to stop emitting the alarm signal (step 46).

With reference to step 40, if the controller determines that the merchandise tag has not been removed from the merchandise product, the controller determines whether the merchandise tag is in motion matching a predetermined motion profile (e.g., motion for a predetermined motion length of time without a stop of motion for more than a predetermined motion stop time) (step 50). In various embodiments the motion profile is selected based on motion conditions matching a conditions indicative of theft (e.g., a thief must move the merchandise product from the area in which it is displayed to the exit and may not set the merchandise product down, thus, in one embodiment a predetermined motion profile is movement for an extended period without the merchandise product stopping moving for more than a predetermined stop time period). If the controller determines that the merchandise tag is not in motion matching a predetermined motion profile, the controller proceeds to step 40.

In one embodiment, once the controller determines that the merchandise tag is in motion matching the predetermined motion profile, the controller will make an additional determination before controlling the emitter to emit an alarm signal. In one embodiment if a merchandise product is being stolen, it may be-placed in a low light environment while the thief moves towards other items or an exit (e.g., placed in a purse, pocket, or bag while the thief moves). In one embodiment, the controller determines whether an input from the light sensor indicates that the merchandise tag is in a low light environment. Additionally, the controller also determines whether an input from the motion sensor indicates that the merchandise tag is in motion. If the controller determines from these inputs that the merchandise tag is both in motion and in a low light environment for more than a predetermined time period, the controller controls the emitter to emit an alarm signal.

If the controller determines that the merchandise tag is in motion matching a predetermined motion profile, the controller determines whether the merchandise tag is in motion and low light for more than a predetermined time without interruption of more than a predetermined interruption time (step 52) (e.g., whether the motion sensor senses motion and the light sensor senses a light level below a predetermined light level for more than a predetermined time period without the motion sensor not sensing motion or the light sensor not sensing a light level below a predetermined light level for more than a predetermined interruption time period).

If the controller determines that the merchandise tag is in motion and low light for more than the predetermined time without interruption for more than a predetermined interruption time, the controller controls the emitter to emit an alarm signal (step 54). The controller determines whether the emitter has been emitting an alarm for more than a predetermined time period (step 56). If the controller determines that the emitter has not been emitting an alarm signal for more than the predetermined time period, the controller proceeds to step 54. If the controller determines that the emitter has been emitting an alarm signal for more than the predetermined time period, the controller controls the emitter to stop emitting the alarm signal (step 46).

Generally, in one embodiment, when a merchandise tag coupled to a merchandise product is put into, for example, a pocket to be stolen, the merchandise tag may determine that a condition potentially indicative of theft exists and emit an alarm signal.

In one embodiment, the controller first determines whether the merchandise tag and the merchandise product are in motion that matches a predetermined motion profile (e.g., if a merchandise product is put into a thief's pocket and walked toward an exit, the merchandise product may be in motion without interruption for longer than a predetermined time period; if the motion profile is set as motion for longer than a predetermined time period, the merchandise tag will determine that the merchandise product is in motion that matches the predetermined motion profile).

In one embodiment, once the controller has determined that the merchandise product is in motion that matches the predetermined motion profile, the controller monitors the light level and motion of the merchandise tag to determine whether to control the emitter to emit an alarm signal (e.g., the controller monitors the input from the light sensor to determine whether the merchandise product is in a low light environment and monitors the input from the motion sensor to determine whether the merchandise product is also in motion). In one embodiment, when the controller determines that the merchandise tag is both in a low light environment and in motion for a predetermined amount of time, e.g., the merchandise tag coupled to a merchandise product is in a pocket of a thief moving towards an exit, for example, the controller may determine to control the emitter to emit an alarm signal. In one embodiment the merchandise tag also monitors whether either the light level or motion is interrupted for more than a predetermined time period (e.g., the potential thief removes the merchandise product with the merchandise tag from his or her pocket and leaves it on a shelf, no longer in a low light condition and no longer in motion) and if so, may determine not to emit an alarm signal.

With reference to step 52, if the controller determines that the low light or motion of the merchandise tag have been interrupted for more than the predetermined interruption time period, the controller determines whether the interruption of motion or low light has been for more than a predetermined reset time period (step 58). If controller determines that the interruption has not been for more than a predetermined reset time period, the controller proceeds to step 52. If the controller determines that the interruption has been for more than a reset time period, the controller proceeds to step 50.

Figure 6:
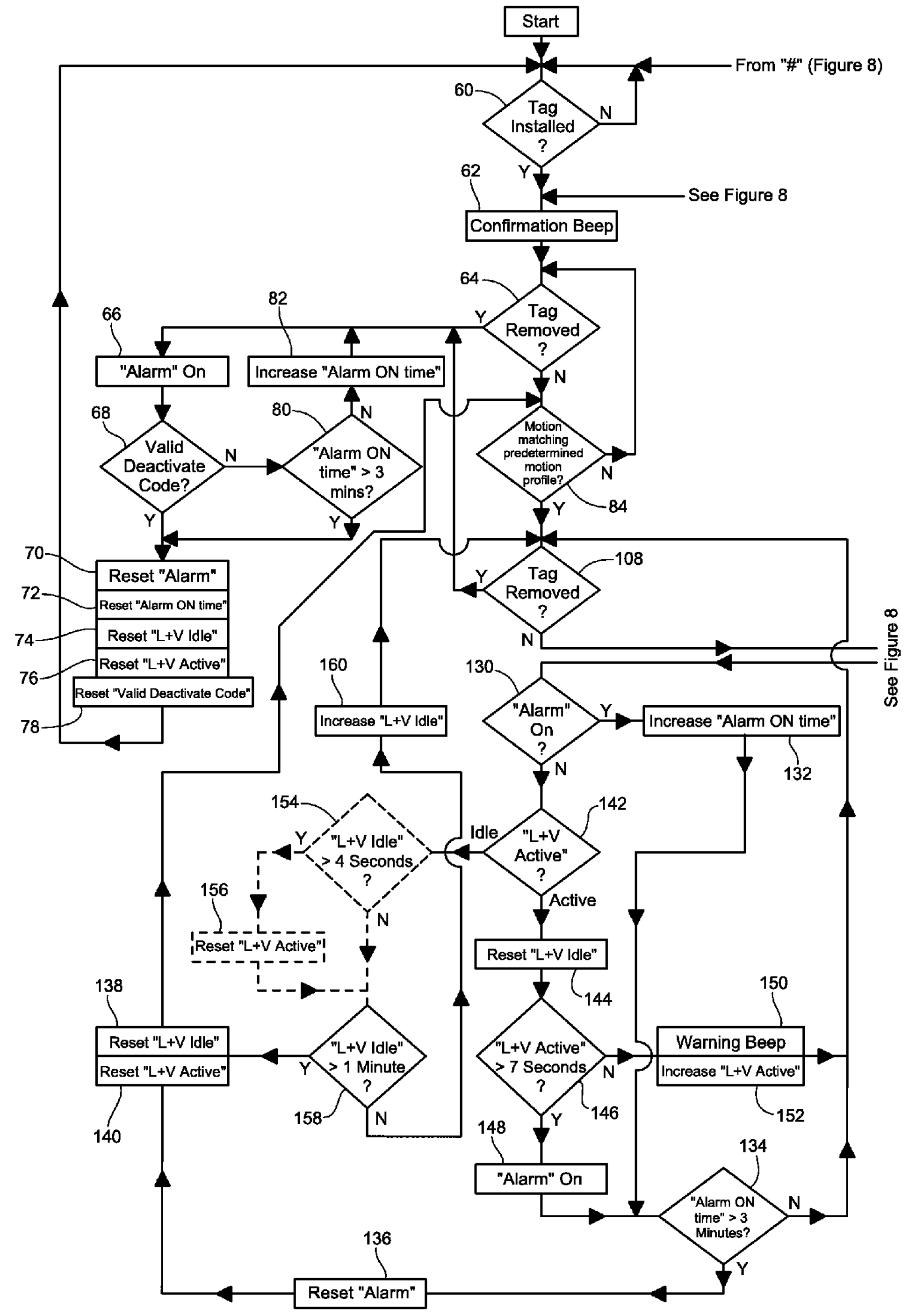
FIG. 6 is a flow diagram illustrating another embodiment of a method of controlling an embodiment of a merchandise tag.
Figure 7:
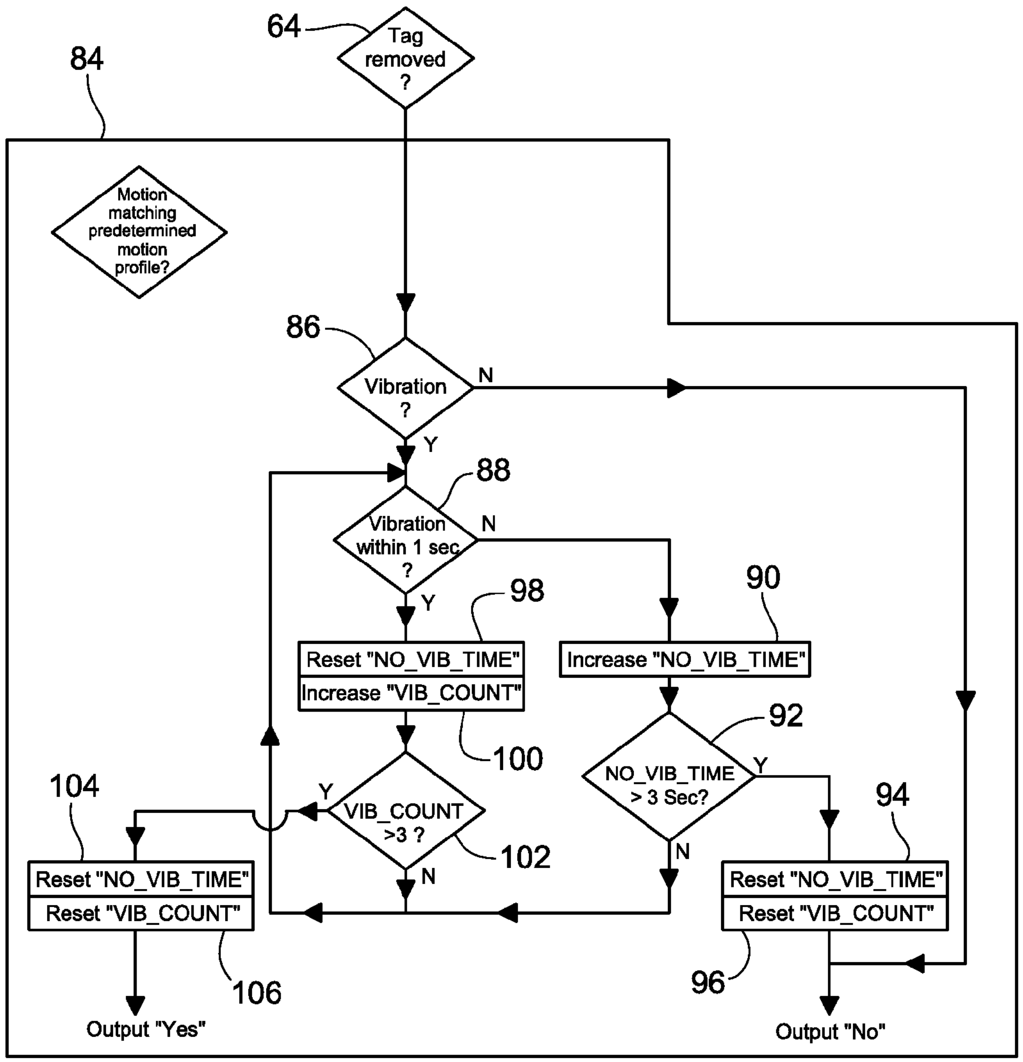
FIG. 7 is a detail flow diagram illustrating an embodiment of sub-steps of step 84 in FIG. 6 according to an exemplary embodiment.
Figure 8:
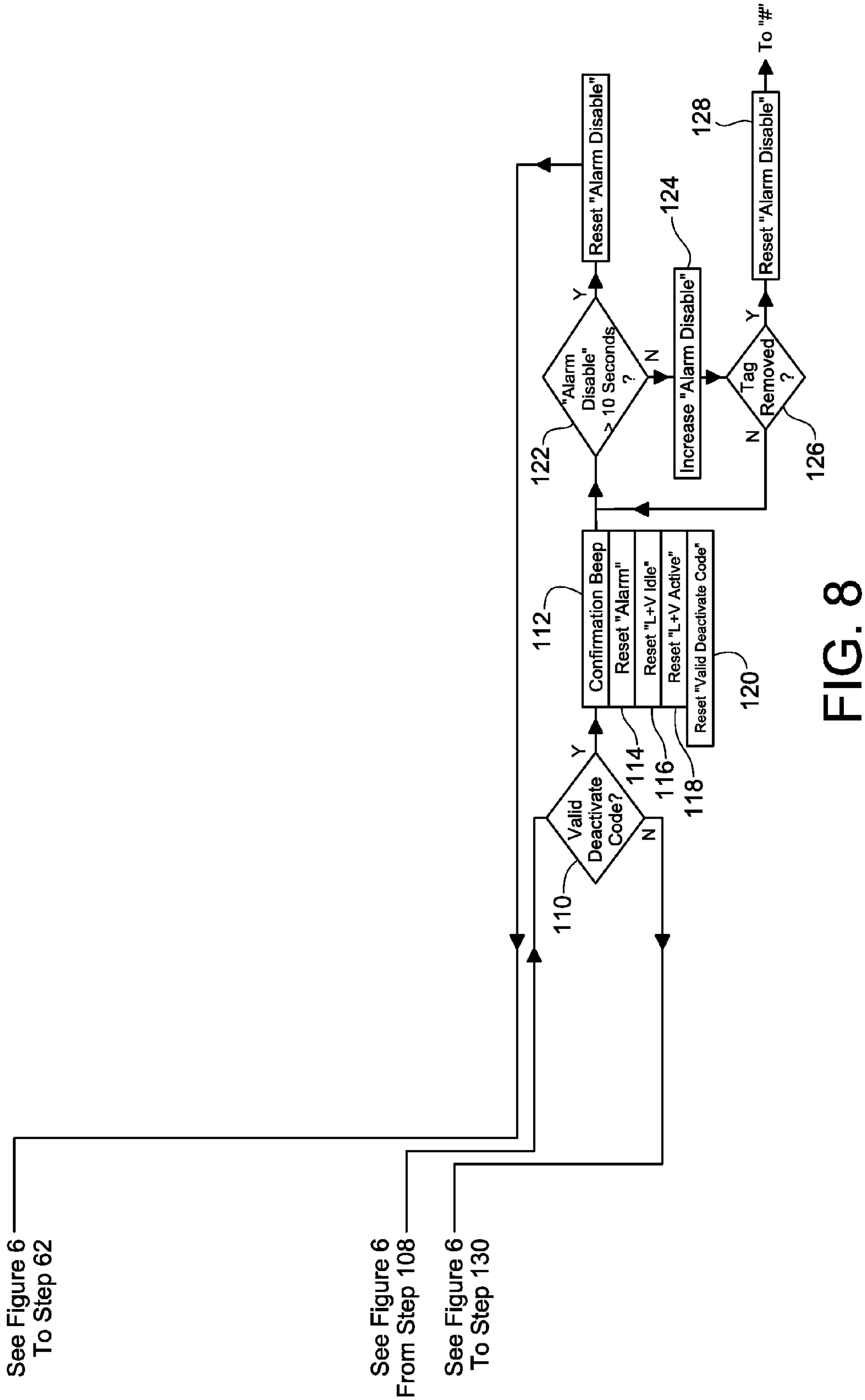
FIG. 8 is a flow diagram illustrating an embodiment of a portion the method illustrated in and continued from FIG. 6 as indicated in FIG. 6.

With reference to FIGS. 6-8, a flow diagram of another embodiment of a method of controlling an embodiment of a merchandise tag is illustrated. In one embodiment, the method may be used to control a merchandise tag such as merchandise tag 20, illustrated in FIGS. 1-4. The embodiment of the method may also be used to control other embodiments of merchandise tags. In one embodiment, the merchandise tag controlled with the embodiment of the method described below includes a controller coupled to an emitter, a light sensor, and a motion sensor. In another embodiment, the merchandise tag also includes a receiver coupled to the controller.

In the illustrated embodiment, the controller determines whether or not the merchandise tag is coupled to a merchandise product (step 60). In one embodiment, the controller does so by determining whether or not the activation button 30 of the merchandise tag has been actuated.

When the controller determines that the merchandise tag has been installed, the controller controls the emitter to emit a signal indicating installation, in the illustrated embodiment, an audible confirmation beep (step 62). In other embodiments, the emitter may emit any other suitable type of signal.

The controller determines whether the merchandise tag has been removed from the merchandise product (step 64) (e.g., in one embodiment indicated by whether or not the activation button 30 is actuated). If the controller determines that the tag has been removed, it controls the emitter to emit an alarm signal (step 66), or continues causing the emitter to emit an alarm signal if it is already causing the emitter to emit an alarm signal. The controller keeps track of whether the emitter is emitting an alarm signal ("Alarm"), for example with an alarm status variable, flag, etc.

The controller determines whether it has received a signal with a valid deactivate code (step 68). In one embodiment, when the receiver of the merchandise tag receives a signal including a deactivate code, the controller determines whether the deactivate code is valid, and if it is valid, the controller stores that a valid deactivate code has been received ("Valid Deactivate Code"). The signal with the deactivate code may be any suitable type of signal including any suitable code, protocol, indicator, etc., from which the controller may determine that the deactivate code is valid. If the controller determines that a valid deactivate code has been received, the controller controls the emitter to stop emitting the alarm signal and resets "Alarm" (step 70).

Additionally, in one embodiment, the controller keeps track of the amount of time that the alarm has been on ("Alarm ON Time"). If the controller determines that a valid deactivate code has been received, the controller resets the "Alarm ON Time" (step 72).

As described further below, in one embodiment the controller determines when the light level is below a predetermined light level and when the light level is above a predetermined light level. Additionally, the controller determines when the merchandise tag is in motion matching a predetermined motion profile. When the controller determines that the light level is below a predetermined light level and the merchandise tag is in motion matching a predetermined motion profile, the controller keeps track of the fact that both of these conditions are present (activates "L+V Active") and keeps track of how long these conditions are both present (length of time of "L+V Active").

In one embodiment, when the controller determines that either the light level is above the predetermined light level or the merchandise tag is not in motion matching a predetermined motion profile, the controller deactivates "L+V Active" ("L+V Active" idle) and keeps track of how long either the light level is above the predetermined light level or the merchandise tag is not in motion matching a predetermined motion profile (length of time of "L+V Idle").

If the controller determines that a valid deactivate code has been received, the controller resets "L+V Idle" (step 74), resets "L+V Active" (step 76), resets "Valid Deactivate Code" (step 78), and proceeds to step 60. After the controller resets "Valid Deactivate Code" (step 78), the controller will determine that the merchandise tag has not received valid deactivate code the next time that the controller reaches step 68 unless the merchandise tag receives a signal with a valid deactivate code after "Valid Deactivate Code" has been reset by the controller (step 78).

With reference to step 68, if the controller determines that a signal with a valid deactivate code has not been received, the controller determines whether the emitter has been emitting an alarm signal for less than a predetermined alarm time period, in the illustrated embodiment, whether "Alarm ON Time" is less than three minutes (step 80). If the emitter has been emitting an alarm signal for less than the predetermined alarm time period (if "Alarm ON Time" is less than three minutes), the controller updates the amount of time that the emitter has been emitting the alarm signal (increases "Alarm ON Time) (step 82) and proceeds to step 66.

With reference to step 64, if the controller determines that the merchandise tag has not been removed from the merchandise product, the controller determines whether there is motion matching a predetermined motion profile (step 84).

FIG. 7 illustrates an embodiment of a method of determining whether an embodiment of a merchandise tag is in motion matching a predetermined motion profile. The controller determines whether there is vibration of the merchandise tag (step 86), e.g., from a signal received from the motion detector. If the controller determines that there is no vibration of the merchandise tag, the controller determines that there is no motion matching a predetermined motion profile and proceeds to step 64 (FIG. 6).

If the controller determines that there is vibration of the merchandise tag, the controller determines whether there has been vibration within the last predetermined vibration time period, illustrated in FIG. 6 as whether there has been vibration within one second (step 88).

The controller keeps track of the amount of time that there has been no vibration of the merchandise tag ("NO_VIB_TIME"). Additionally, the controller keeps track of the amount of times that the controller has determined that there has been vibration of the merchandise tag within one second ("VIB_COUNT").

If the controller determines that there has not been vibration within 1 second, the controller increases "NO_VIB_TIME" (step 90). The controller determines whether the "NO_VIB_TIME" is greater than a predetermined no vibration time period, in the illustrated embodiment whether "NO_VIB_TIME" is greater than three seconds (step 92).

If the controller determines that "NO_VIB_TIME" is not greater than three seconds, the controller proceeds to step 88. If the controller determines that "NO_VIB_TIME" is greater than three seconds, the controller determines that there is not motion matching a predetermined motion profile, resets "NO_VIB_TIME" (step 94), resets "VIB_COUNT" (step 96) and proceeds to step 64 (FIG. 6).

If the controller determines that there has been vibration within one second (step 88), the controller resets "NO_VIB_TIME" (step 98) and increases "VIB_COUNT" (step 100). The controller determines whether "VIB_COUNT" is greater than a predetermined amount, in the illustrated embodiment, whether "VIB_COUNT" is greater than three (step 102). If the controller determines that "VIB_COUNT" is not greater than three, the controller proceeds to step 88. If the controller determines that "VIB_COUNT" is greater than three, the controller resets "NO_VIB_TIME" (step 104), resets "VIB_COUNT" (step 106), determines that there is motion matching a predetermined motion profile, and proceeds to step 108 (FIG. 6).

With reference to FIG. 6, the controller determines whether the merchandise tag has been removed (step 108). If the merchandise tag has been removed, the controller proceeds to step 66.

With reference to FIGS. 6 and 8, if the controller determines that the merchandise tag has not been removed, the controller determines whether the merchandise tag has received a signal containing a valid deactivate code (step 110). If the merchandise tag has received a signal containing a valid deactivate code, the controller controls the emitter to emit a signal (step 112), illustrated in FIG. 8 as a confirmation beep. The controller resets "Alarm" (step 114), resets "L+V Idle" (step 116), resets "L+V Active" (step 118), and resets "Valid Deactivate Code" (step 120).

The controller may not control the emitter to emit an alarm for a period of time after determining in step 110 that a signal containing a valid deactivate code has been received by the merchandise tag. The controller keeps track of the amount of time that the controller is in the state in which it may not control the emitter to emit an alarm ("Alarm Disable"). The controller determines whether "Alarm Disable" is greater than ten seconds (step 122). If "Alarm Disable" is not greater than ten seconds, the controller increases "Alarm Disable" (step 124). The controller determines if the merchandise tag has been removed from the merchandise product (step 126). If the merchandise tag has not been removed from the merchandise product, the controller proceeds to step 122.

If the controller determines that the merchandise tag has been removed, the controller resets "Alarm Disable" (step 128) and proceeds to step 60 (see FIG. 6).

If the controller determines in step 122 that "Alarm Disable" is greater than ten seconds, the controller resets "Alarm Disable" (step 129) and proceeds to step 62 (see FIG. 6).

With reference to FIG. 6, the controller determines whether "Alarm" is on (step 130), i.e., whether the emitter is emitting an alarm signal. If "Alarm" is on, the controller increases "Alarm ON Time" (step 132). The controller determines if "Alarm ON Time" is greater than three minutes (step 134). If "Alarm ON Time" is not greater than three minutes, the controller proceeds to step 108.

If the controller determines that "Alarm ON Time" is greater than three minutes, the controller controls the emitter to stop emitting an alarm signal and resets "Alarm" (step 136), resets "L+V Idle" (step 138), rests "L+V Active" (step 140), and proceeds to step 84.

If the controller determines at step 130 that "Alarm" is not on (e.g., that the emitter is not emitting an alarm signal), the controller determines whether "L+V Active" is active or idle (step 142), i.e., whether or not both the light is below the predetermined light level and the merchandise tag is in motion.

If "L+V Active" is active, the controller resets "L+V Idle" (step 144). The controller determines whether "L+V Active" is greater than a predetermined "L+V Active" time period, in the embodiment illustrated in FIG. 6 whether "L+V Active" is greater than seven seconds (step 146). If "L+V Active" is greater than seven seconds, the controller controls the emitter to emit an alarm signal and sets "Alarm" to on (step 148). The controller determines whether "Alarm ON Time" is greater than a predetermined "Alarm ON Time" time period, in the illustrated embodiment three minutes (step 134). If the "Alarm ON Time" is not greater than three minutes, the controller proceeds to step 108. If the "Alarm ON Time" is greater than three minutes, the controller resets "Alarm" and controls the emitter to stop emitting the alarm signal (step 136), resets "L+V Idle" (step 138), resets "L+V Active" (step 140) and proceeds to step 84.

With reference to step 146, if the controller determines that "L+V Active" is not greater than seven seconds, the controller controls the emitter to emit a warning signal, in the illustrated embodiment, an audible warning beep (step 150), increases "L+V Active" (step 152), and proceeds to step 108. In one embodiment, by emitting a warning beep, an embodiment of a merchandise tag may allow a potential thief to reconsider the theft and return the merchandise product before the emitter emits an alarm signal. In one embodiment the warning beep is approximately 60 decibels.

With reference to step 142, if the controller determines that "L+V Active" is idle, the controller determines whether "L+V Idle" is greater than a predetermined "L+V Active" reset time period, in the illustrated embodiment four seconds (step 154).

If "L+V Idle" is greater than four seconds, the controller resets "L+V Active" (step 156). The controller determines whether "L+V Idle" is greater than a predetermined "L+V" reset time period, in the illustrated embodiment one minute (step 158). If "L+V Idle" is not greater than one minute, the controller increases "L+V Idle" (step 160) and proceeds to step 108. If "L+V Idle" is greater than one minute, the controller resets "L+V Idle" (step 138), resets "L+V Active" (step 140), and proceeds to step 84.

Thus, generally, in one embodiment, once the controller has determined that merchandise tag is in motion matching a predetermined motion profile, the controller determines whether the merchandise tag is both in motion and the light is below the predetermined light level for longer than a predetermined time period without interruption of these two conditions for more than a predetermined interruption time. If so, the controller is configured to control the emitter to emit an alarm signal. However, if the merchandise tag is both in motion matching a predetermined motion profile and the light is below the predetermined light level for the predetermined time period or less the controller does not control the emitter to emit an alarm signal. And, if either of these conditions are interrupted for more than a predetermined interruption time (e.g., the merchandise tag stops moving for longer than the predetermined interruption time, the light level goes above the predetermined light level for more than the predetermined interruption time, etc.), the time period required for an alarm for motion matching a predetermined motion profile and light below the predetermined light level is reset.

Figure 9:
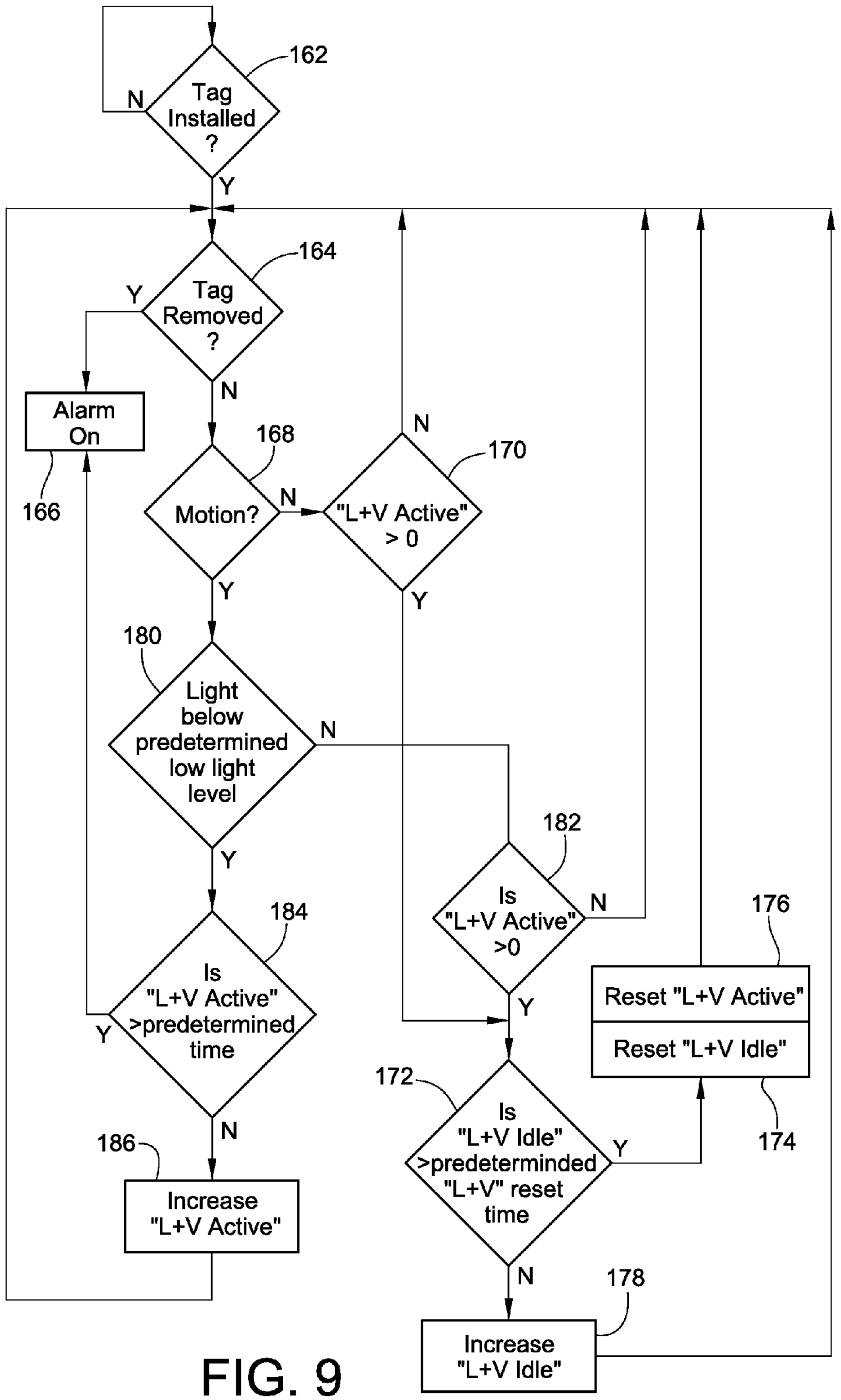
FIG. 9 is a flow diagram of another embodiment of a method of controlling an embodiment of a merchandise tag.

With reference to FIG. 9, a flow diagram of an embodiment of a method of controlling an embodiment of a merchandise tag is illustrated. The embodiment of the method may be used to control a merchandise tag such as merchandise tag 20, illustrated in FIGS. 1-4. The embodiment of the method may also be used to control other embodiments of merchandise tags. In one embodiment, the merchandise tag controlled with the embodiment of the method described below includes a controller coupled to an emitter, a light sensor, and a motion sensor. In another embodiment, the merchandise tag also includes a receiver coupled to the controller.

In one embodiment, when the merchandise tag is installed (step 162) on a merchandise product, the controller determines whether the merchandise tag has been removed from the merchandise product (step 164). If the controller determines that the merchandise tag has been removed from the merchandise product, the controller controls the emitter to emit an alarm signal (step 166). If the controller determines that the merchandise tag has not been removed from the merchandise product, the controller determines whether the merchandise tag is in motion (step 168) (e.g., whether the motion detector signals to the controller that the merchandise tag is in motion).

As in the previous embodiment, in one embodiment the controller determines when the light level is below a predetermined light level and when the light level is above a predetermined light level. When the controller determines that the light level is below a predetermined light level and the merchandise tag is in motion, the controller keeps track of the fact that both of these conditions are present and keeps track of how long these conditions are both present ("L+V Active").

If the controller determines that the merchandise tag is not in motion, the controller determines whether "L+V Active" is greater than zero (step 170). If "L+V Active" is not greater than zero, the controller proceeds to step 164. If the controller determines that "L+V Active" is greater than zero, the controller determines whether "L+V Idle" is less than a predetermined "L+V" reset time (step 172).

If "L+V Idle" is greater than the predetermined "L+V" reset time, the controller resets "L+V Idle" (step 174), resets "L+V Active" (step 176), and proceeds to step 164. If "L+V Idle" is not greater than the predetermined "L+V" reset time, the controller increases "L+V Idle" (step 178) and proceeds to step 164.

With reference to step 168, if the controller determines that the merchandise tag is in motion, the controller determines whether the light level is below a predetermined low light level (step 180). If the light is not below the predetermined low light level, the controller determines whether "L+V Active" is greater than zero (step 182).

If "L+V Active" is not greater than zero, the controller proceeds to step 164. If "L+V Active" is greater than zero, the controller determines whether "L+V Idle" is greater than the predetermined "L+V" reset time (step 172). If "L+V Idle" is greater than the predetermined "L+V" reset time, the controller resets "L+V Idle" (step 174), resets "L+V Active" (step 176), and proceeds to step 164. If "L+V Idle" is not greater than the predetermined "L+V" reset time, the controller increases "L+V Idle" (step 178) and proceeds to step 164.

With reference to step 180, if the controller determines that the light level is below the predetermined low light level, the controller determines whether "L+V Active" is greater than a predetermined "L+V Active" time period (step 184).

If "L+V Active" is greater than the predetermined "L+V Active" time period, the controller controls the emitter to emit an alarm signal (step 166). If "L+V Active" is not greater than the predetermined "L+V Active" time period, the controller increases "L+V Active" (step 186) and proceeds to step 164.

The merchandise tag 20, including its housing 28, illustrated in the figures is one embodiment of a merchandise tag. The embodiments of controllers described above may be used to control other merchandise tags with other housings of other suitable sizes, shapes, and structural configurations.

The order or sequence of any process or method steps may be varied or re-sequenced according to alternative embodiments.

In one embodiment, the controller described above is a microprocessor. In other embodiments, the controller may be any suitable type of controller. In one embodiment, the embodiments of methods described above may be implemented via hardware, firmware, software, or any other suitable implementation.

In one embodiment, a controller for a merchandise tag may have a predetermined light level of approximately 1.5 Lux (i.e., if the light level is below approximately 1.5 Lux, the merchandise tag is considered to be in a low light environment indicative of potential theft). In another embodiment, the controller for a merchandise tag may have a predetermined light level of approximately 1 Lux.

For purposes of this disclosure, motion detectors of embodiments of merchandise tags may be configured to detect at least one of vibration, motion relative to the earth, acceleration, etc. In various embodiments, detection of any of these may be "motion" as used in the embodiments of methods of controlling a merchandise tag described above.

In one embodiment, the motion sensor of a merchandise tag may be a piezoelectric sensor. In other embodiments, any suitable type of motion sensor configured to detect any suitable type of motion with any suitable type of measurement may be used.

In one embodiment, the controller is electrically coupled to the emitter, motion sensor, and light sensor. In one embodiment, the controller is in operative communication with the emitter, motion sensor, and light sensor, but the controller is not physically coupled to the emitter, motion sensor, and/or light sensor. In another embodiment, the controller is coupled to the emitter, motion sensor, and light sensor by electrical leads. For purposes of this disclosure, "coupled" includes mechanically coupled, electrically coupled, in operative communication, etc.

In the above embodiments of methods of control, while the controller is described as keeping track of certain events and time periods in terms of counts (e.g., "VIB_COUNT" is described as the number of times that controller determines that there has been vibration of the merchandise tag within one second (step 88)) and time periods (e.g., "NO_VIB_TIME" is described as the amount of time that the has not been a vibration of the merchandise tag), in other embodiments, each count of events may be kept track of by the controller as a time period. Additionally, in other embodiments, each time period may be kept track of by the controller as a count of events. In some embodiments, controllers may use counters, timers, or other suitable mechanisms.

In one embodiment, the controller may control the emitter to stop emitting a signal by not causing the emitter to emit a signal. In another embodiment, the controller may signal the emitter to control the emitter to stop emitting a signal.

In one embodiment, when the controller resets a time, e.g., "L+V Idle," "L+V Active," etc., the controller sets the time, such as a time kept by a counter, to zero.

In one embodiment, a merchandise tag is also configured to operate with an EAS system configured to sound an alarm when the merchandise tag passes through an EAS gate. The EAS system may be a magnetic system, an acousto-magnetic system, a radio frequency system, a microwave system, a video surveillance system, or any other suitable type of system.

In one embodiment, when the power supply 38 of an embodiment of a merchandise tag is low, e.g., below a predetermined level, the controller will control the emitter to emit a low battery signal.

In one embodiment, a merchandise tag allows store personnel to identify the location of an item when hidden based on the signal emitted by the emitter.

In one embodiment, a merchandise tag may be configured to receive a signal sent from store personnel remote from the controller. Such a signal may be an infrared signal, visible light signal, RF signal (e.g., AM signal, FM signal, etc.), microwave signal, combinations thereof, or any other suitable type of signal. The controller may be configured to control the emitter to stop emitting a signal (e.g., an alarm signal, a warning signal, etc.) when it receives such a signal from store personnel.

In one embodiment, the emitter is a speaker configured to emit audible signals. In another embodiment, the emitter also includes a light emitter (e.g., LED, compact fluorescent light, etc.). In one embodiment, the emitter is configured to emit a signal receivable by a monitoring station. In another embodiment, an emitter is configured to emit an alarm signal and to emit ink, paint, indelible ink, indelible paint, or another flagging mechanism to flag the thief stealing the merchandise product.

For purposes of this disclosure, embodiments of merchandise tags coupled to merchandise products include coupling merchandise tags to the merchandise products themselves, the packaging of the merchandise products, etc. Additionally, merchandise tags may be integrally formed with the merchandise products themselves or the packaging of merchandise products.

The example of placing a merchandise product in a pocket is merely exemplary. Conditions potentially indicative of theft that may be detected by embodiments of merchandise tags exist in various other situations, e.g., merchandise products being placed in bags, under clothing, etc.

In one embodiment the theft detection device is a tag. In another embodiment, the theft detection device is a wired alarm clip. In other embodiments, the theft detection device may be any suitable theft detection mechanism.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A theft detection device configured to be coupled to a product, comprising:
- a light sensor;
- a motion sensor;
- an emitter; and
- a controller coupled to the light sensor, the motion sensor, and the emitter;
- wherein the controller is configured to determine when the light level sensed by the light sensor is below a threshold light level;
- wherein the controller is configured to determine whether the theft detection device is in motion; and
- wherein the controller is configured to control the emitter to emit an alarm signal based on the sensed motion of the theft detection device and the light level sensed by the sensor;
- wherein the controller is configured to receive a signal from the light sensor indicative of the sensed light level and to process the signal to determine whether the sensed light level is below the light level threshold;
- wherein when the controller determines that the theft detection device is in motion, the controller is configured to determine if the theft detection device has previously been in motion within a first predetermined time period;
- wherein if the controller determines that the theft detection device has previously been in motion within the first predetermined time, the controller is configured to reset a first counter and to increase a second counter;
- wherein the controller is configured to determine whether the second counter is greater than a first predetermined value, and if it is to determine that the theft detection device is in motion matching a predetermined motion profile;
- wherein if the controller determines that theft detection device has not been previously been in motion within the first predetermined time, the controller is configured to increase the first counter, determine if the first counter is greater than a second predetermined value, and if it is to determine that the theft detection device is not in motion matching a predetermined motion profile.

2. The theft detection device of claim 1, wherein when the controller determines that the theft detection device is in motion matching a predetermined motion profile, the controller is configured to control the emitter to emit an alarm signal when the controller determines that the motion sensor senses motion of the theft detection device and the light sensor senses a light level below the predetermined light level for more than a second predetermined time period without an interruption in either the motion sensed by the motion sensor or the light level sensed by the light sensor being below the predetermined light level of more than a third predetermined time period.

3. The theft detection device of claim 1, wherein the controller is configured to determine whether the theft detection device has removed from the product and to control the emitter to emit an alarm signal when it is determined that the theft detection device has been removed from the product.

4. The theft detection device of claim 1, further comprising a receiver configured to receive a stop signal, the receiver being coupled to the controller;
- wherein the controller is configured to control the emitter to stop emitting the alarm signal based on receipt of the stop signal.

5. The theft detection device of claim 1, further comprising an activator coupled to the controller, the activator configured to provide an indication to the controller when the theft detection device is coupled to a product.

6. The theft detection device of claim 1, wherein the emitter comprises a speaker configured to emit an audible signal.

7. A method of controlling a theft detection device configured to be coupled to a product, the theft detection device including a light sensor and an emitter, the method comprising:
- coupling the theft detection device to a product;
- determining when a potential theft condition exists;
- causing the emitter to emit an alarm signal when the potential theft condition exists;
- determining whether the theft detection device is in motion; when it is determined that the theft detection device is in motion, determining whether the theft detection device has previously been in motion within a predetermined time period;
- when it is determined that the theft detection device has previously been to motion within the predetermined time period,
- resetting a first counter, increasing a second counter, and determining whether the second counter is greater than a first predetermined value;
- when it is determined that the theft detection device has not previously been in motion within the predetermined time period,
- increasing the first counter and determining whether the first counter is greater than a second predetermined value;
- when it is determined that the second counter is greater than the first predetermined value,
- determining that the theft detection device is in motion matching a predetermined motion profile; and
- when it is determined that the first counter is greater than the second predetermined value,
- determining that the theft detection device is not in motion matching a predetermined motion profile.

8. The method of claim 7, wherein the step of determining when a potential theft condition exists includes determining when the theft detection device has been removed from the product.

9. The method of claim 7, wherein the step of determining when a potential theft condition exists includes determining when both a light level sensed by the light sensor is below a predetermined light level and the product is in motion.

10. The method of claim 9, wherein the step of determining when both the light level sensed by the light sensor is below a predetermined light level and the theft detection device is in motion includes:

increasing a first counter when the theft detection device is in motion matching a predetermined motion profile and the light sensor is sensing a light level below a predetermined level;

increasing a second counter when after the first counter has been increased either the theft detection device is not in motion matching a predetermined motion profile or the light sensor is sensing a light level not below the predetermined level;

determining that a potential theft condition exists when the first counter exceeds a first predetermined value; and resetting the first and second counters when the second counter exceeds a second predetermined value.

11. The method of claim 7, further comprising causing the emitter to emit a warning signal prior to causing the emitter to emit an alarm signal.

12. The method of claim 8, further comprising determining whether the theft detection device has received a stop signal to control the emitter to stop emitting the alarm signal; and when it is determined that a signal indicating to control the emitter to stop emitting the alarm signal is received, causing the emitter to stop emitting the alarm signal.

13. A method of controlling a theft detection device coupled to a product, the theft detection device including a light sensor, a motion sensor, and an emitter, the method comprising:

determining whether to control the emitter to emit an alarm signal including:

determining whether the theft detection device is in motion matching a predetermined motion profile; and determining whether the light sensor detects a light level below a predetermined light level;

when it is determined to control the emitter to emit the alarm signal, causing the emitter to emit the alarm signal;

wherein the step of determining whether to control the emitter to emit an alarm signal includes:

determining whether the motion sensor is in motion and the light sensor detects a light level below the predetermined light level;

increasing a first counter while the motion sensor is in motion and the light sensor detects a light level below the predetermined light level;

when the first counter is non-zero and the motion sensor is not in motion or the light sensor detects a light level that is not below the predetermined light level, increasing a second counter;

when the first counter is greater than a first predetermined value, determining to control the emitter to emit an alarm signal; and when the second counter is greater than a second predetermined value, resetting the first and second counters.

14. The method of claim 13, wherein the step of determining whether to control the emitter to emit an alarm signal further comprises determining whether the theft detection device has been removed from the product.

15. The method of claim 13, wherein the step of determining whether the theft detection device is in motion matching a predetermined motion profile comprises:

determining whether the motion sensor is in motion for a total time greater than a first predetermined time before the amount of time the motion sensor is not in motion exceeds a second predetermined amount.

16. A controller for a theft detection device configured to be coupled to a product, the theft detection device comprising a light sensor, a motion sensor, and an emitter, the controller comprising:

an output configured to be coupled to the emitter;

wherein the controller is configured to receive an input from the light sensor indicative of the light level sensed by the light sensor;

wherein the controller is configured to receive an input from the motion sensor indicative of when the motion sensor is in motion; and wherein the controller is configured to send a control signal to the emitter through the output to emit an alarm signal based on the input from the light sensor and the input from the motion sensor;

further comprising a first counter and a second counter;

wherein the controller is configured to increase the first counter when the input from the light sensor to the controller indicates that the light sensor senses a light level below a predetermined light level and the input from the motion sensor indicates that the motion senor senses that it is in motion;

wherein the controller is configured to increase the second counter after the first counter has been increased when either the input from the motion sensor indicates that the motion sensor is not in motion or when the input from the light sensor indicates that the light sensor is not sensing a light level below the predetermined light level;

wherein the controller is configured to signal the emitter through the output to emit an alarm signal when the first counter exceeds a first predetermined value; and wherein the controller is configured to reset the first and second counters when the second counter exceeds a second predetermined value.

* * * * *

UNITED STATES PATENT AND TRADEMARK OFFICE

CERTIFICATE OF CORRECTION

PATENT NO. : 8,884,761 B2
APPLICATION NO. : 13/591023
DATED : November 11, 2014
INVENTOR(S) : Thomas E. Valiulis It is certified that error appears in the above-identified patent and that said Letters Patent is hereby corrected as shown below:

On Title Page 1, item (73) Assignee: The word "Souther" should be corrected to read ---Southern--.

Signed and Sealed this
Twenty-sixth Day of May, 2015

Michelle K. Lee
*Director of the United States Patent and Trademark Office*